(12) United States Patent
Masuda

(10) Patent No.: US 9,293,167 B2
(45) Date of Patent: Mar. 22, 2016

(54) LIBRARY APPARATUS

(71) Applicant: NEC Corporation, Minato-ku, Tokyo (JP)

(72) Inventor: Takashi Masuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 14/070,735

(22) Filed: Nov. 4, 2013

(65) Prior Publication Data

US 2014/0126774 A1 May 8, 2014

(30) Foreign Application Priority Data

Nov. 7, 2012 (JP) .................................. 2012-244965

(51) Int. Cl.
*G06K 9/00* (2006.01)
*G11B 15/68* (2006.01)

(52) U.S. Cl.
CPC ........... *G11B 15/6835* (2013.01); *Y10T 403/20* (2015.01)

(58) Field of Classification Search
None
See application file for complete search history.

(56) References Cited

U.S. PATENT DOCUMENTS

| 2002/0141755 A1* | 10/2002 | Manabe | 396/536 |
| 2012/0027467 A1* | 2/2012 | Okuda et al. | 399/262 |
| 2012/0250182 A1* | 10/2012 | Makino | 360/92.1 |

FOREIGN PATENT DOCUMENTS

| JP | H8-212745 A | 8/1996 |
| JP | H9-212984 A | 8/1997 |
| JP | 2001-92597 A | 4/2001 |
| JP | 2003-226059 A | 8/2003 |
| JP | 2005-521112 A | 7/2005 |
| JP | 2008-210474 A | 9/2008 |
| JP | 2010-67316 A | 3/2010 |
| WO | 2011/092826 A1 | 8/2011 |

\* cited by examiner

*Primary Examiner* — Weiwen Yang

(57) ABSTRACT

Disclosed is a library apparatus capable of indicating an availability state of a slot according to the availability state of the slot that a magazine has.

The storage library apparatus 1 rotates the first position P that indicates a usable state of a slot 7 by a first protection lever 4 being pushed by a accessor 3 which can convey, contacts against in a stopper 6, accordingly, is fixed by a lock component 5 and is fixed to the lock component 5 by rotating a second position R that indicates the unusable state of a slot 7.

8 Claims, 11 Drawing Sheets

LIBRARY APPARATUS

This application is based upon and claims the benefit of priority from Japanese Patent Application No. 2012-244965, filed on Nov. 7, 2012, the disclosure of which is incorporated herein in its entirety by reference.

TECHNICAL FIELD

For example, the present invention relates to a structure of a library apparatus which handles a storage device.

BACKGROUND ART

In a generally known system which handles a large amount of data, a magnetic tape library apparatus (hereinafter, "tape library", also just referred to as "library") is utilized for the sake of such as a data protection, a disaster countermeasure, a restoration from an obstacle and a prolonged data storage.

Therefore, increasing capacity and prolongation of a storage period are required for the magnetic tape library apparatus. The magnetic tape library apparatus is also required for the improvement of utilization efficiency and the reduction in the operational management cost.

As a related art which exists before the present patent application, Patent Literature 1 discloses a technology concerning to an optical disc changer.

More specifically, a magazine of the optical disc changer disclosed in the Patent Literature 1 has an IC (Integrated Circuit: referred to as "IC" hereafter) memory.

When the magazine is charged in a body of the optical disc changer, the optical disc changer memorizes a variety of information related to the magazine (such as the identification number of the magazine, the usage date, the insertion times and the array order of a built-in storage disk cartridge) in the IC memory.

Patent Literature 2 discloses a technology concerning to a medium control unit. More specifically, the medium control unit disclosed in the Patent Literature 2 detects whether the medium kept in the slot exists by a sensor.

When it is judged that the medium kept in the slot has been replaced based on the state of the sensor held in advance and the detection result detected by the sensor, the apparatus updates the medium storage information which specifies the medium.

In other words, when an action takes place enabling the storage and retrieval of the medium, the apparatus disclosed in the Patent Literature 2 updates the medium storage information. On the other hand, when there are no action capable of the storage and retrieval of the medium, the apparatus does not update the medium storage information.

Patent Literature 3 discloses a technology concerning to an image forming device. More specifically, the apparatus disclosed in the Patent Literature 3 reduces a power consumption much more in the standby mode by keeping the standby mode (in other words, the power consumption is reduced in the standby state in which it is not used) or by reducing the power consumption when displaying that it is the standby mode.

Patent Literature 4 discloses a library apparatus, a position detection method of a storage medium and a technology concerning to a magazine.

In a position management of the storage medium which has stored a plurality of storage medium in an insertion and removal direction of the storage medium, more specifically, the library apparatus disclosed in the Patent Literature 4 detects the presence of the storage medium stored in the back side without moving the storage medium in a near side.

THE PRECEDING TECHNICAL LITERATURE

Patent Literature

[Patent Literature 1] Japanese Unexamined Patent Application Publication No. 1997 (H09) -212984
[Patent Literature 2] Japanese Unexamined Patent Application Publication No. 2001-092597
[Patent Literature 3] Japanese Unexamined Patent Application Publication No. 2003-226059
[Patent Literature 4] Japanese Unexamined Patent Application Publication No. 2010-067316
[Patent Literature 5] Japanese Unexamined Patent Application Publication No. 2008-210474
[Patent Literature 6] Japanese Unexamined Patent Application Publication No. 1996 (H08) -212745
[Patent Literature 7] Japanese Patent Domestic Re-publication No. WO2011092826
[Patent Literature 8] Japanese Unexamined Patent Application Publication (Translation of PCT Application) No. 2005-521112

BRIEF SUMMARY OF INVENTION

Problem(s) to be Solved by the Invention

For example, a magnetic tape library apparatus which has been known in general has a magnetic tape cartridge (also referred to as "cartridge magnetic tape") which stores the magnetic tape, the magazine having slots can store a plurality of magnetic tape cartridges and a magnetic tape drive which reads and writes data to the magnetic tape.

The magnetic tape library apparatus has an accessor which conveys a desired magnetic tape cartridge to the magnetic tape drive from a slot. The magnetic tape library apparatus controls the operations of the magnetic tape drive and the accessor and has a control unit storing the state of the magnetic tape library apparatus and the magazine.

When the number of the usable slots is limited by the licensing agreement or by the practical usage restriction, for example, the case may take place that the magnetic tape library apparatus cannot use all of the slots that the magazine provides.

Therefore, in the magnetic tape library apparatus, it is necessary to set and manage one each slot with a separating the usable slot from the unusable slot.

For example, an administrator of the magnetic tape library apparatus (hereinafter, it is just abbreviated as "administrator") can set and confirm the state of the slot by operating the magnetic tape library apparatus and the server (administration terminal) connected to the magnetic tape library apparatus under the state which enables the communication (hereinafter, "connection under the state which enables the communication" is just abbreviated as "connection" in this application) via a communication network (hereinafter, "communication network" is just abbreviated as "network" by the this application).

However, for example, when taking out the magazine from the magnetic tape library apparatus and exchanging the magnetic tape cartridge, there are no means to judge the availability (usable or not usable) of the slot by the magazine only which is taken out. In other words, the administrator cannot judge which slot to put the magnetic tape cartridge in.

The administrator has apprehension which inserts the magnetic tape cartridge in a slot which cannot be used. In other words, the administrator may insert the magnetic tape cartridge by mistake in an unusable slot.

By operating an operation panel provided in the server and the magnetic tape library apparatus, the administrator spends time and effort for confirming the availability state in the slot.

The technology disclosed by the Patent Literature 1 stores the information concerning to a magazine in the IC memory.

That is, when the magazine is not provided, the optical disc changer disclosed in the Patent Literature 1 cannot acquire a variety of information stored in the IC memory. Therefore, in the technology disclosed in the Patent Literature 1, the labor occurs since it is needed to read out a variety of information from the IC memory as well as to provide the magazine in the optical disc changer when acquiring a variety of information.

The magazine has no means to present a variety of information recorded in the IC memory.

Therefore, in the Patent Literature 1, an insertion and removal operation of a disk cartridge is needed based on a variety of information read from the IC memory.

That is, for example, when a user performs an exchanging work of the optical disk cartridge from the magazine, there is apprehension that performs the exchanging work for the optical disk cartridge different from the optical disk cartridge to be changed.

The technology disclosed in the Patent Literature 2 only stays in the description of updating the medium storage information and does not refer to anything concerning to presenting the availability of the slot when the action takes place which enables to retrieve the medium kept in the slot.

Therefore, the medium control unit disclosed by the Patent Literature 2 cannot easily confirm the slot availability which indicates it is usable or not usable.

The technology disclosed by the Patent Literature 3 stays in the description that the characters of "Under waiting" or the like which indicates a stand-by state can be visually recognized on the display surface provided in an image forming device when shifting to a standby mode and is not referring to the preventing operation different from the contents shown on the display surface.

That is, for example, it is a problem that it cannot prevent to advance the work when a user overlooks the indication such as "Under waiting" shown on the display surface, The library apparatus disclosed by the Patent Literature 4 provides a first color filter and a second color filter in which the wavelength transmission characteristics are different and emits the white color light (emitted light) to the first color filter and the second color filter.

The emitted light passes by the order of the first color filter and the second color filter. The emitted light reflects by an optical mirror and enters a light receiving unit of the library apparatus.

As a result, the description on the library apparatus stays in that the presence of a plurality of the storage medium in the insert and remove direction of the medium is detected by comparing the received red light intensity and blue light intensity with the respective reference values and does not refer to which shows the availability of the slot.

Therefore, in the apparatus, it cannot be confirmed easily that the slot is usable or not usable. The apparatus does not refer at all to the wrong insertion-extraction of a storage medium. As a related art, for example, the technology which locks the cartridge is disclosed by Patent Literature 5 to 8.

The main object of the present invention is to provide a library apparatus capable of indicating a state of a slot availability according to a state of a slot availability that the magazine has.

SUMMARY

In order to settle the problem mentioned above, the library apparatus according to the present invention includes the following configuration.

That is, a library apparatus according to the present invention includes a lock component protruded to one or more slot sides which can insert and detach a cartridge;

a rotary shaft provided near the slot;

a protection lever which can rotate around the rotary shaft as a center axis; and a stopper provided in a position preventing a rotating when contacting against one end of the shorter side direction of the protection lever;

wherein the protection lever, by being pushed an accessor capable of convey the cartridge, rotates to a first position indicating a usable state of the slot, thereby contacts against the stopper and is fixed by the lock component, and the protection lever is, by rotating to the second position that indicates the unusable state, fixed by the lock component.

BRIEF DESCRIPTION OF THE DRAWINGS

Exemplary features and advantages of the present invention will become apparent from the following detailed description when taken with the accompanying drawings in which.

EXEMPLARY EMBODIMENT

Hereinafter, exemplary embodiments of the present invention will be described in detail with reference to drawings. In the following description, a case will be described that the library apparatus according to the present invention has been applied to the storage library apparatus whose storage has stored in the cartridge (housing article).

Further, for convenience of an explanation, the explanation will be described by using a three dimensional (X, Y and Z) coordinate axis written in each drawing.

[The First Exemplary Embodiment]

Figure 1:
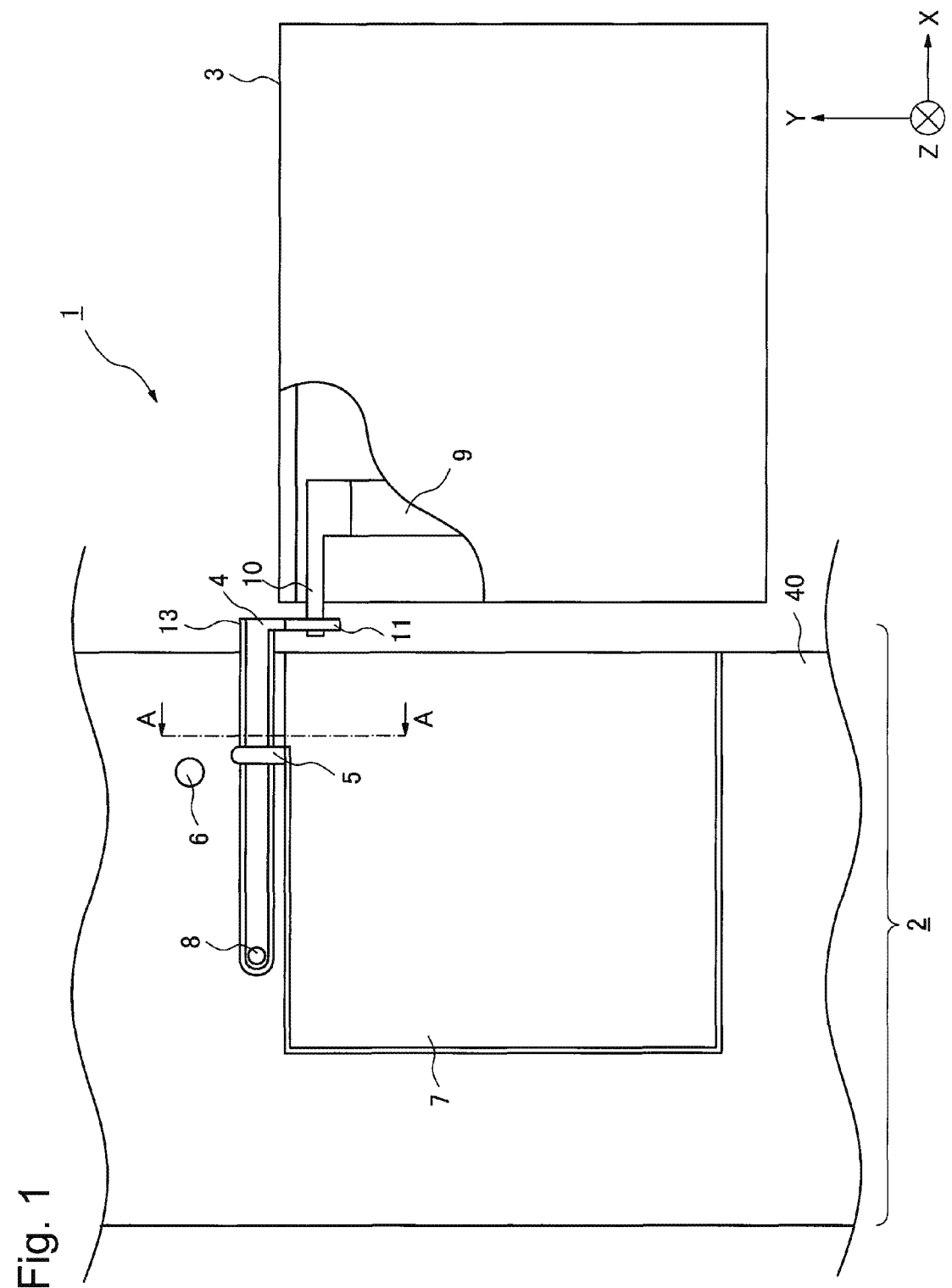
FIG. 1 is a top view which shows a main unit of a storage library apparatus in a first embodiment of the present invention.

A storage library apparatus 1 in the first embodiment of the present invention will be described with reference to FIGS. 1 to 6. FIG. 1 is a top view which shows a main unit of the storage library apparatus 1 in the first embodiment of the present invention.

In FIG. 1, the storage library apparatus 1 has a magazine 2 and an accessor 3.

More specifically, the magazine 2 has a first protection lever 4, a lock component 5, a stopper 6, a slot 7 and a rotary shaft 8. The magazine 2 has a plurality of slots in which storage (in other words, storage medium) can store a cartridge stored.

Further, for the convenience of the explanation, as an example, the explanation will be focused on a configuration in which the magazine has one slot 7. However, the embodiment according to the present invention is not limited to the configuration. The magazine 2 may adopt a configuration having one or more slots 7.

For example, it is assumed that the magazine 2 whose expression is omitted in FIG. 1 for the convenience of the description and the illustration will have a magazine cover in the +(plus) Z direction. It is assumed that the magazine 2 has magazine base 40 extended in the ±(plus minus) Y direction (this can be applied to the following exemplary embodiment, also). More specifically, it is assumed that the slot 7 makes a face opening in the +(plus) X direction a front. It is assumed that the slot 7 makes the side which is erected in the −X direction so as to oppositely face to the front the back. it is assumed that the slot 7 makes the side which is erected in the +Y direction a right side face. On the other hand, it is assumed that the slot 7 makes the side which is erected in the −Y direction a left side face so as to oppositely face to the right side face. It is assumed that the slot 7 makes the plane of −Z direction a base. On the other hand, it is assumed that the magazine 2 makes the plane in +Z direction opposing to the base a top surface (main surface and upper panel).

More specifically, the slot 7 has a shape of square or substantially shape. The front (the +X direction and the right hand direction in the FIG. 1) in a slot 7 is formed into the opening shape so that an unillustrated cartridge in which the storage has been stored can be inserted and removed.

That is, the cartridge can be inserted and removed from the slot 7 by sliding in the horizontal direction (±X direction in FIG. 1).

Further, in the following description, for convenience of the explanation, it will be described using a magnetic tape cartridge as an example of a typical cartridge. However, the present invention described using this embodiment for instance is not limited to the configuration mentioned above (this can be applied to the following exemplary embodiment, also).

For the convenience of the description, as an example, the configuration has been described that the slot 7 has the shape of the square or the substantially square. However, the embodiment according to the present invention is not limited to the configuration. The slot 7 may adopt the shape matching to the shape of the magnetic tape cartridge (this can be applied to the following exemplary embodiment, also).

In the following description, for convenience of the explanation, the protection lever described in this embodiment is called the first protection lever 4 (this can be applied to the following exemplary embodiment, also).

Figure 2:
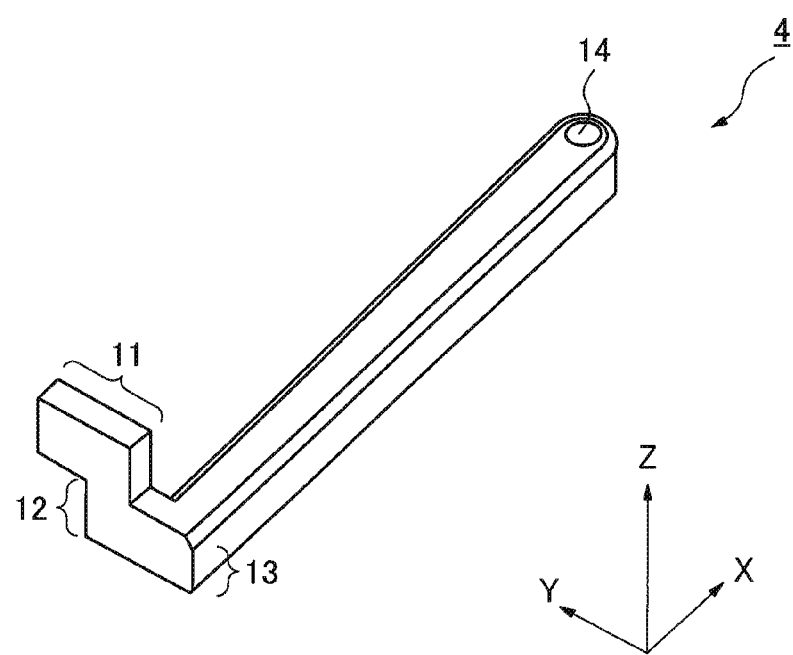
FIG. 2 is a perspective view which shows the composition of the first protection lever in the first embodiment of the present invention.

FIG. 2 is a perspective view which shows the composition of the first protection lever 4 in the first embodiment of the present invention. The first protection lever 4 forms one (the +X direction in FIG. 2) of a longitudinal direction in a straight line or a substantially straight line.

The first protection lever 4 is given the chamfering processing for a ridgeline (+Z direction and both angles in a top surface in FIG. 2) in a top surface in the lengthwise direction to.

It is noted that, the chamfering processing may process it to the degree that a projection 15 can ride easily on a surface in the first protection lever 4 (this can be applied to the following exemplary embodiment, also).

As a result, the projection 15 of the lock component 5 mentioned later can be easily ridden on the surface of the first protection lever 4.

A rotating axis hole 14 is formed into a circularity shape or a substantially circularity shape so that the first protection lever 4 can rotate as a center axis of a rotary shaft 8 in one (the +X direction in FIG. 2) of a longitudinal direction. Further, as a center axis, the rotating axis hole 14 may provide the rotary shaft 8 in the size enabling to rotate (the rotary shaft 8 of this embodiment will be described later).

The first protection lever 4 has the first contacting surface 12, the second contacting surface 13 and a first block 11 formed like an L shape or a substantially L shape in the other (the −X direction in FIG. 2) of a longitudinal direction.

Further, the first block 11 has been described as an example with the configuration example in which it is formed in a shape of an L shape or a substantially L shape according to the embodiment mentioned above for the convenience of the description. However, the embodiment according to the present invention is not limited to the configuration. The first block 11 may adopt the shape that can work as a stopper which prevents the insertion and detachment of an unillustrated magnetic tape cartridge. In the case, for example, the first block 11 may adopt the straight line shape or the substantially straight line shape. However, the present invention described using this embodiment as an example is not limited to the configuration mentioned above (this can be applied to the following exemplary embodiment, also).

Figure 3:
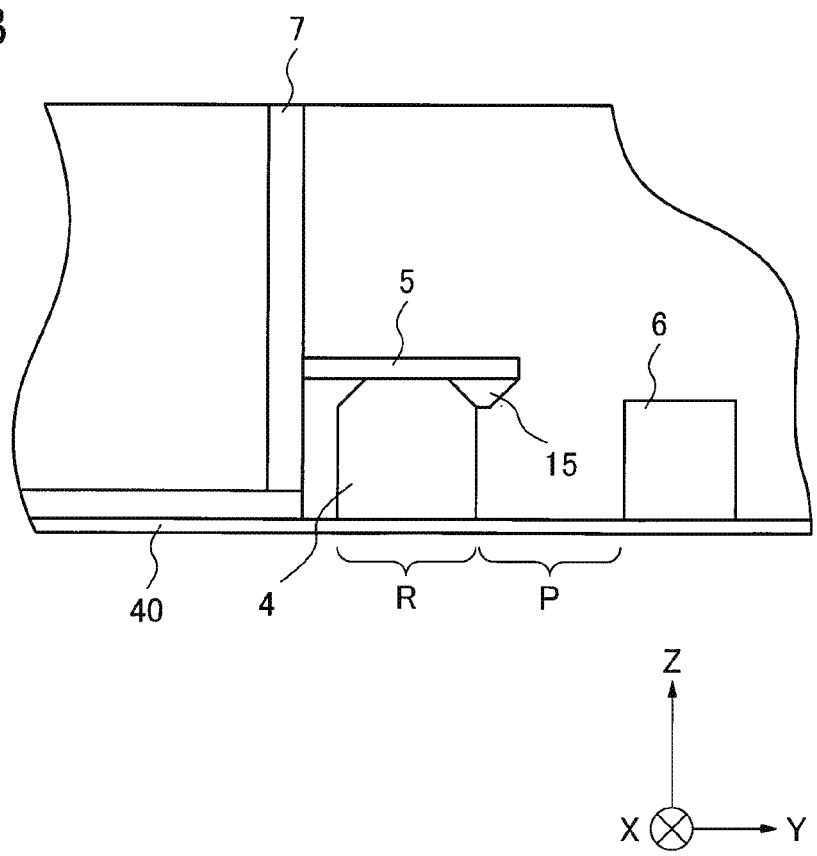
FIG. 3 is a cross section which shows a main unit of a magazine in the first embodiment of the present invention.

FIG. 3 is a cross section (A-A cross section in FIG. 1) which shows a main unit of the magazine 2 in the first embodiment of the present invention.

A lock component 5 is protruded outside the right side face in the slot 7 so as to be parallel or substantially parallel (the +Y direction in FIG. 3) to the magazine base 40 from the right side face in the slot 7.

The lock component 5 may be protruded outside the right side face in the slot 7 so that a surface (+Z direction in FIG. 3) of the first protection lever 4 may contact with a base of the lock component 5. However, the present invention described using this embodiment as an example is not limited to the configuration mentioned above (this can be applied to the following exemplary embodiment, also).

The various material such as the metal and the resin can be adopted as the material of the lock component 5 if the lock component 5 is transformed when riding on a surface of the first protection lever 4 and it has the elastic force which returns to the original shape and the strength that enables to fix the first protection lever 4 after the transforming,.

The lock component 5 has a projection 15 formed in a cone shape or a substantially cone shape to −Z direction in FIG. 3 in one (+Y direction in FIG. 3) of a longitudinal direction.

Further, according to the embodiment mentioned above, for the convenience of the description as an example, the lock component 5 has been described using the configuration having the projection 15. However, the embodiment according to the present invention is not limited to the configuration. The lock component 5 may adopt a configuration having the projection 15 formed into a semicircular shape or a substantially semicircular shape. However, the present invention described using this embodiment as an example is not limited to the configuration mentioned above (this can be applied to the following exemplary embodiment, also).

A stopper 6 has a cylindrical shape or the substantially cylindrical shape. The stopper 6 is provided in the magazine base 40.

Further, according to the embodiment mentioned above, for the convenience of the description, the configuration has been described that the stopper 6 has a cylindrical shape or a substantially cylindrical shape as an example. However, the embodiment according to the present invention is not limited to the configuration. By contacting against the first protection lever 4, the stopper 6 may adopt the shape that can restrain the first protection lever 4 from rotating in the +Y direction shown in FIG. 1 (this can be applied to the following exemplary embodiment, also).

The rotary shaft 8 has a cylindrical shape or the substantially cylindrical shape. The rotary shaft 8 is provided in a magazine base 40. The rotary shaft 8 may be installed in the position where the right side face in the slot 7 and a side in the lengthwise direction in the first protection lever 4 are located in parallel or located closely in substantially parallel.

Next, then accessor 3 conveys a magnetic tape cartridge (not shown) between the magnetic tape drive (not shown) and the magazine 2.

More specifically, the accessor 3 has a picker 9. As shown in FIG. 1, the picker 9 has a picker arm 10 formed into the +Y direction in an L shape a substantially L shape.

By combining the operation which moves the picker 9 to the ±X direction in FIG. 1 and the operation which moves the accessor 3 to the ±Y direction in FIG. 1, the accessor 3 can push the first protection lever 4 by the picker arm 10 formed into the picker 9. The accessor 3 can insert and remove a magnetic tape cartridge.

Further, according to the embodiment mentioned above, for the convenience of the description, as an example, the picker arm 10 has been described using the configuration that it is formed in an L shape or a substantially L shape. However, the embodiment according to the present invention is not limited to the configuration. The picker arm 10 may adopt the shape capable of pushing the first protection lever 4. The picker arm 10 may adopt the shape added to an insertion and detachment system of the magnetic tape cartridge.

According to the embodiment mentioned above, for the convenience of the description, as an example, the picker arm 10 has been described using the configuration that it is formed into one (the +Y direction in FIG. 1) of the picker 9 for instance. However, the embodiment according to the present invention is not limited to the configuration. The picker arm 10 may adopt the configuration that it is formed into the other (the −Y axial direction in FIG. 1) of the picker 9 (this can be applied to the following exemplary embodiment, also).

Next, the more concrete operation of the storage library apparatus 1 according to the first embodiment of the present invention will be described.

It is noted that, as an example, the operation of the storage library apparatus 1 will be described when the first protection lever 4 moves from the position that indicates the usable state to the position that indicates the unusable state, in detail.

In the example described below, by operating a server connected to a storage library apparatus 1 via a communication network with an administrator, it is assumed that the slot 7 is set from the position which indicates a usable state to the position which indicates an unusable state.

Figure 8:
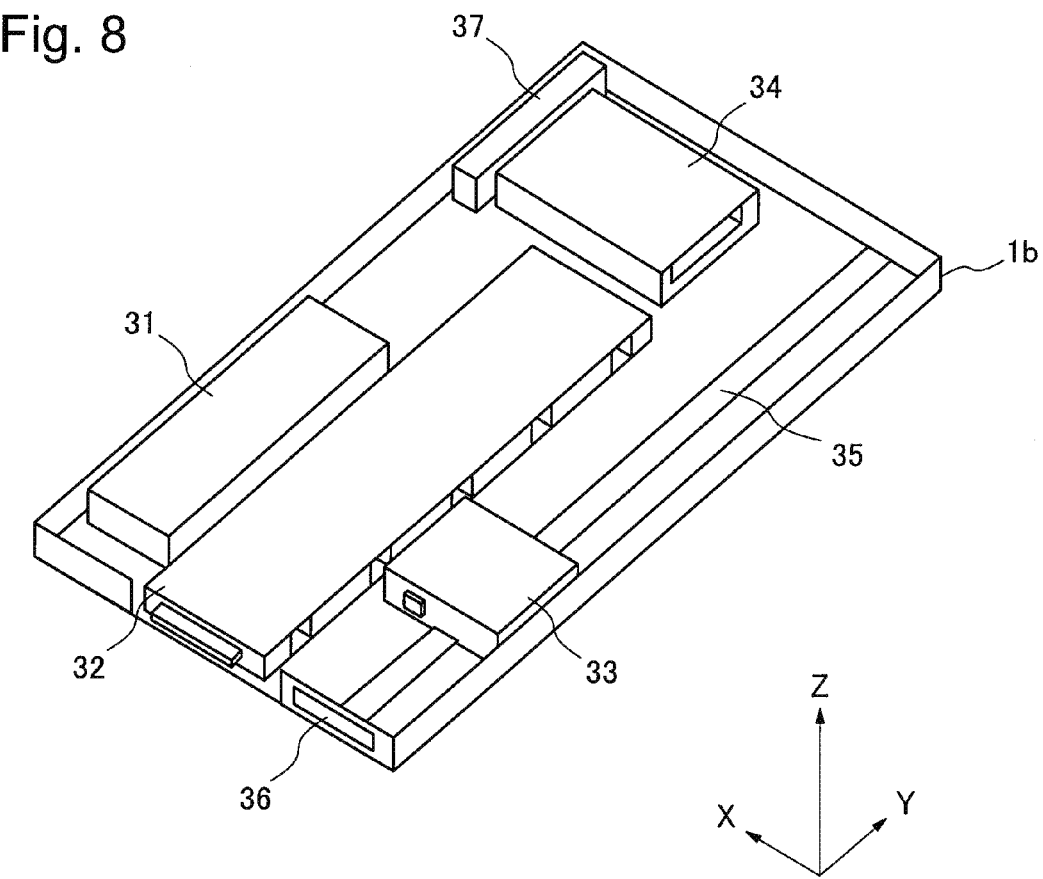
FIG. 8 is a perspective view which shows the composition of the magnetic tape library apparatus in an example according to the second embodiment of the present invention.

It is assumed that the storage library apparatus 1 will hold (store) the availability state (usable or unusable) of the slot 7 set by an administrator in an unillustrated control unit (an external apparatus, for example a control unit 31 shown in FIG. 8) that the storage library apparatus 1 has.

Although described using the configuration mentioned before for convenience of the explanation, the present invention is not limited to this exemplary configuration (this can be applied to the following exemplary embodiment, also).

Figure 4:
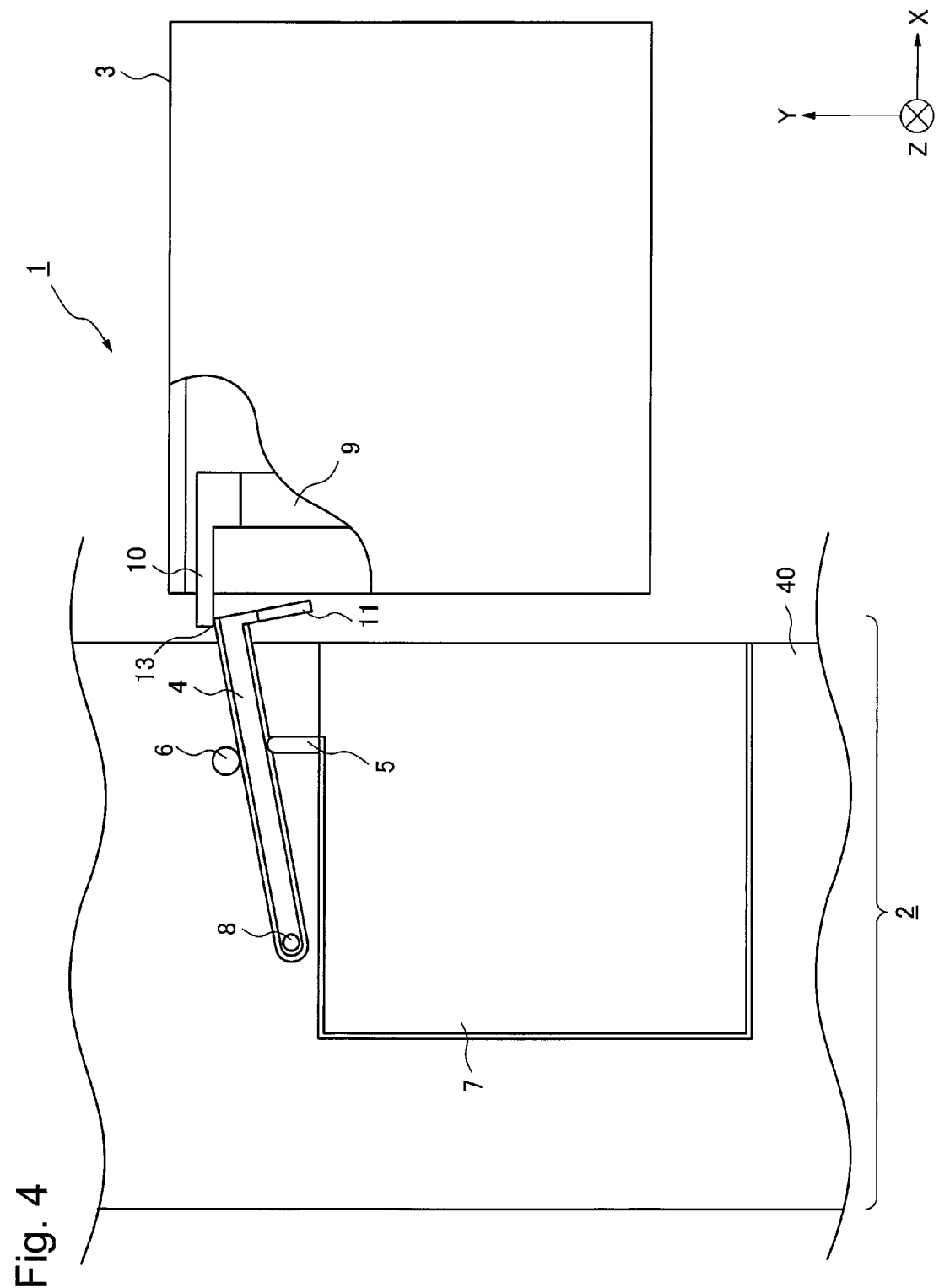
FIG. 4 is a top view which exemplifies the state when a picker arm of an accessor have contacted against the first protection lever in the position that indicates the usable state in the first embodiment of the present invention.

FIG. 4 is a top view which exemplifies the state when the picker arm 10 of the accessor 3 has contacted against the first protection lever 4 in the position that indicates the usable state in the first embodiment of the present invention.

Figure 5:
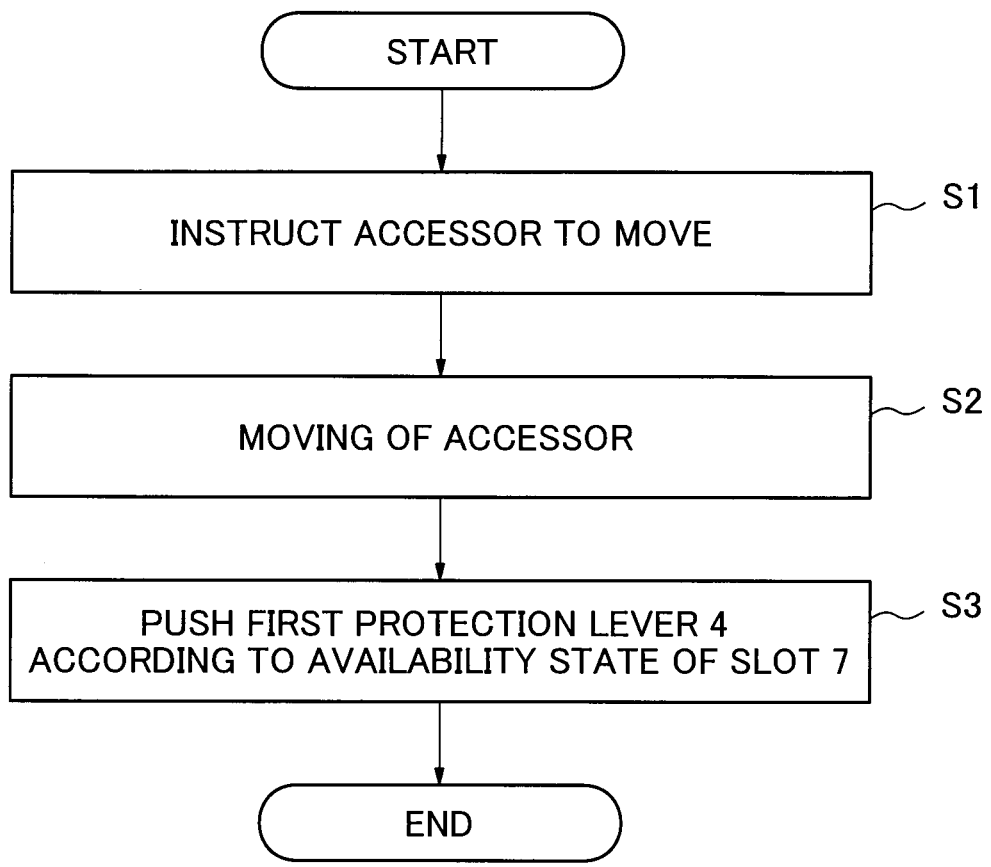
FIG. 5 is a flowchart which shows the operation when moving the first protection lever according to the availability state of the slot that the storage library apparatus in the first embodiment of the present invention performs.

FIG. 5 is a flowchart which shows the operation when moving the first protection lever 4 according to the availability state of the slot 7 that the storage library apparatus 1 in the first embodiment of the present invention performs.

The operation procedure of the storage library apparatus 1 will be described along with the flowchart.

Further, in the following description, for convenience of the explanation, the position (in other words, the position where the stopper 6 shown in FIG. 4 and the lengthwise direction of the first protection lever 4 contact against, P shown in FIG. 3) that indicates the usable state is called the first position P. The description calls the position (in other words, the position where a right side face of the slot 7 shown in FIG. 1 and the lengthwise direction of the first protection lever 4 are getting closer in parallel or substantially parallel, R shown in FIG. 3) that indicates the unusable state the second position R (this can be applied to the following exemplary embodiment, also).

Step S1:

According to holding the information which indicates the availability state of the slot 7, a control unit (not shown) of the storage library apparatus 1 issues (outputs) the instruction which moves the position of the first protection lever 4 in the accessor 3.

It is noted that, the control unit outputs the direction, which moves to the position (in other words, the second position R shown in FIG. 3) that indicates the unusable state from the position that indicates the usable state of the first protection lever 4, to the accessor 3.

Step S2:

According to the acquired directions, the accessor 3 moves to the position where the first protection lever 4 can contact with the picker arm 10 of the accessor 3.

By moving the picker arm 10 to the −X direction in FIG. 4, the accessor 3 makes the contacting surface (a first contacting surface 12 shown in FIG. 2 or a second contacting surface 13) and the picker arm 10 of the first protection lever 4 contact against.

More specifically, when moving the first protection lever 4 from the position that indicates the usable state to the position (in other words, the second position R shown in FIG. 3) that indicates the unusable state, the accessor 3 moves to the position where the second contacting surface 13 and the picker arm 10 of the first protection lever 4 can contact against. By moving the picker arm 10 to the −X direction in FIG. 4, the accessor 3 makes second contacting surface 13 and picker arm 10 contact against.

When moving the first protection lever 4 from the unusable state to the position (in other words, the first position P shown in FIG. 3) that indicates the usable state on the one hand, the accessor 3 moves the first contacting surface 12 and the picker arm 10 in the first protection lever 4 to the position which enables to contact against and makes the first contacting surface 12 and the picker arm 10 contact against by moving the picker arm 10 to the −X direction in FIG. 4.

It is noted that, the accessor 3 moves to the position that the second contacting surface 13 and the picker arm 10 contact against.

Step S3:

By moving the own apparatus (accessor 3) to the ±Y direction (the vertical direction in the paper in FIG. 4,) in FIG. 4, the accessor 3 pushes the first protection lever 4 in the position (in other words, the position of either one of the first position P and the second position R) that indicates the availability state of the slot 7 held by the control unit.

More specifically, when moving the first protection lever 4 from the position that indicates the usable state to the position (in other words, the second position R shown in FIG. 3) that indicates the unusable state, the accessor 3 pushes the first protection lever 4 in the position that indicates the unusable state by moving its own apparatus (accessor 3 itself) to the −Y direction in FIG. 4.

On the other hand, when moving the first protection lever 4 from the unusable state to the position (in other words, a first position P shown in FIG. 3) that indicates the usable state, the accessor 3 pushes the first protection lever 4 in the position that indicates the usable state by moving its own apparatus (accessor 3 itself) to the +Y direction in FIG. 4.

As a result, the first protection lever 4 rotates around the rotary shaft 8 as a center to the direction pushed by the accessor 3.

Figure 6:
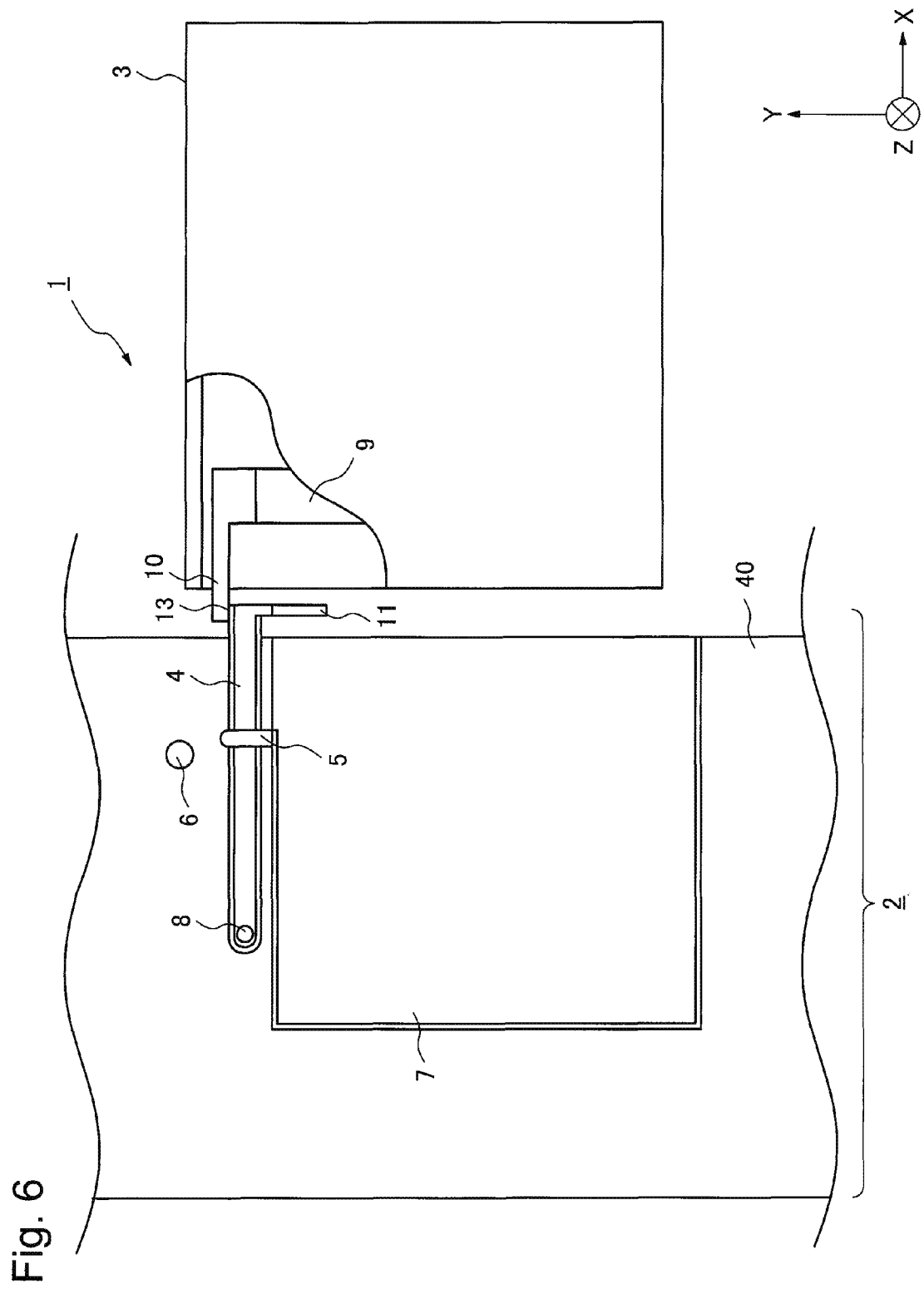
FIG. 6 is a top view which exemplifies the state of the first protection lever in the position that indicates the unusable state in the first embodiment of the present invention.

FIG. 6 is a top view which exemplifies the state of the first protection lever 4 in the position that indicates the unusable state in the first embodiment of the present invention.

It is noted that, the accessor 3 pushes the first protection lever 4 from the position that indicates the usable state to the position that indicates the unusable state by moving its own apparatus (accessor 3 itself) to the −Y direction in FIG. 6.

As a result, the first protection lever 4 rotates around the rotary shaft 8 as a center to the −Y direction in FIG. 6.

More specifically, the first protection lever 4 contacts against the second contacting surface 13 and the picker arm 10 and rotates around the rotary shaft 8 as a center to the −Y direction shown in FIG. 6 by pushing the second contacting surface 13 in the −Y direction in FIG. 6.

As a result, the projection 15 (referring to FIG. 3) provided in an edge of the lock component 5 rides on an upper surface of the first protection lever 4 in the state that it has been crossing the first protection lever 4. That is, the lock component 5 is transformed by the height (+Z direction in FIG. 3) of the projection 15.

When passing the edge of the shorter side direction of the first protection lever 4 in the state that the projection 15 has been crossing as mentioned above, the lock component 5 returns to the original shape. The first protection lever 4 moves so that the right side face in the slot 7 and a side in the lengthwise direction in the first protection lever 4 may become in parallel or in substantially parallel.

Therefore, the lock component 5 can fix the first protection lever 4 by the projection 15.

On the one hand, when rotating the first protection lever 4 from the unusable state to the position (in other words, the first position P shown in FIG. 3) that indicates the usable state, the first protection lever 4 contact against a first contacting surface 12 and the picker arm 10. By pushing the first contacting surface 12 to the +Y direction in FIG. 6, the first protection lever 4 rotates around the rotary shaft 8 as a center to the +Y direction shown in FIG. 6.

As a result, the projection 15 (referring to FIG. 3) provided in an edge of the lock component 5 rides on an upper surface of the first protection lever 4 in the state that it has been crossing the first protection lever 4.

When the edge of the shorter side direction of the first protection lever 4 is passed in the state that a projection 15 intersected as mentioned above, the first protection lever 4 is contacted against the stopper 6. The lock component 5 returns to the original shape.

Therefore, the lock component 5 can fix the first protection lever 4 by the projection 15.

Further, according to the embodiment mentioned above, for convenience of the description, as an example, the storage library apparatus 1 has been described using the configuration having the first protection lever 4 on the right side (on the one hand, the +Y side in FIG. 1) of the slot 7. However, the embodiment according to the present invention is not limited to the configuration. The storage library apparatus 1 may adopt the configuration having the first protection lever 4 on the left side (on the other hand, the −Y side in FIG. 1) of the slot 7 (this can be applied to the following exemplary embodiment, also).

According to the storage library apparatus 1 in this embodiment, the availability state of the slot 7 can be indicated corresponding to the availability state of the slot 7 that the magazine 2 has.

The reason is because the storage library apparatus 1 can rotate in the position that indicates the availability state of the slot 7 by the accessor 3 pushing the first protection lever 4. Therefore, for example, when the magazine 2 is removed from the storage library apparatus 1, the administrator can recognize the availability state of the slot 7 immediately.

That is, for example, when the magnetic tape cartridge is inserted in the slot 7, the administrator can check the slot which is usable by the visual observation easily. Therefore, the administrator can improve the operation efficiency when inserting and detaching.

When the slot 7 is set in the unusable state, the storage library apparatus 1 can prevent the insertion and removal of the magnetic tape cartridge by the first block 11 of the first protection lever 4.

[The Second Exemplary Embodiment]

Next, the second embodiment based on the storage library apparatus 1 according to the first embodiment of the present invention mentioned above will be described. In the following description, it will be described focusing on a characteristic part according to this embodiment. In that case, by attaching the same reference number, the duplicated description will be omitted concerning to the same configuration as each embodiment mentioned above.

A storage library apparatus 1a in the second embodiment of the present invention will be described with reference to FIG. 7.

Figure 7:
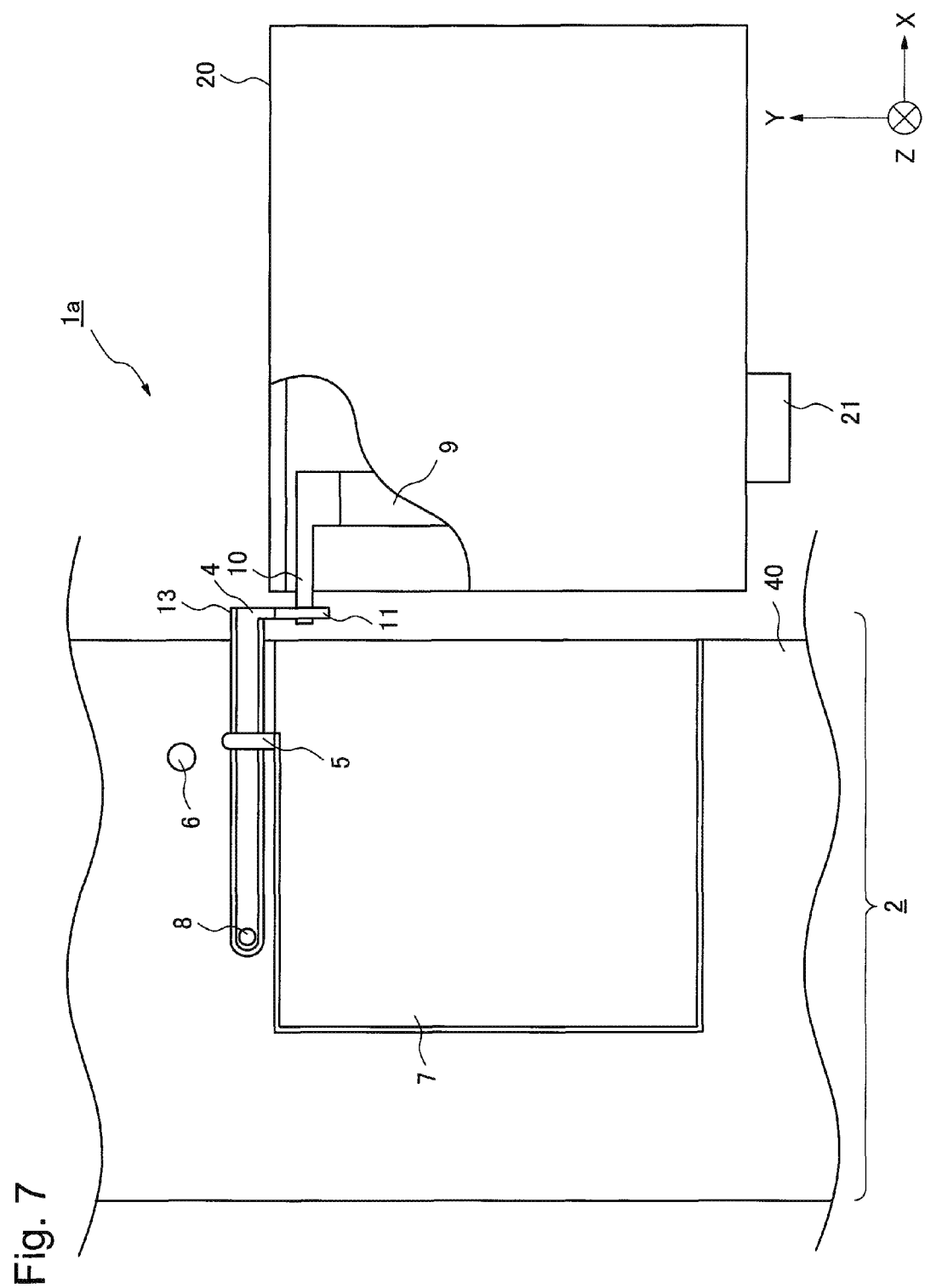
FIG. 7 is a top view which shows a main unit of the storage library apparatus in a second embodiment of the present invention.

FIG. 7 is a top view which shows a main unit of the storage library apparatus 1a in the second embodiment of the present invention.

In FIG. 7, the storage library apparatus 1a has the magazine 2 and an accessor 20.

In FIG. 7, the accessor 20 has a camera 21 in the accessor 3 of the storage library apparatus 1 described in the first embodiment and further, in the left side face (the −Y direction) of the accessor 20.

When acquiring the direction to move the position of the first protection lever 4, the accessor 20 outputs image a data of the first protection lever 4 acquired by the camera 21 to an unillustrated control unit.

Further, because the technology itself which acquires the image data of the first protection lever 4 by the camera 21 can adopt a general technology at present, the detailed description in this embodiment will be omitted (this can be applied to the following exemplary embodiment, also).

The control unit extracts a position information of the first protection lever 4 from the accessor 20 based on acquired the image data of the first protection lever 4. The control unit compares the extracted position information and the information which indicates the availability state (usable or unusable) of the slot 7 that has been already held.

Further, because the technology itself with which the control unit extracts the position of the first protection lever 4 based on the image data can adopt a general technology at present, the detailed description in this embodiment will be omitted (this can be applied to the following exemplary embodiment, also).

According to the comparison result, when it is determined that the position information of the first protection lever 4 is same as the information which indicates the availability state of the slot 7 that has been already held the control unit finishes the processing.

On the other hand, according to the comparison result, when determining that the position information of the first protection lever 4 is different from the information which indicates the availability state of the slot 7 that has been already held, the control unit outputs the direction to move the position of the first protection lever 4 to the accessor 20.

Further, the operation of the accessor 20 when acquiring the direction to move the position of the first protection lever 4 from the control unit, is similar to the operation in the accessor 3 described in the first embodiment. Therefore, the duplicated description will be omitted.

According to the embodiment mentioned above, for the convenience of the description, as an example, the camera 21 has been described using the configuration that it has the accessor 20 in the −Y direction. However, the embodiment according to the present invention is not limited to the configuration.

The camera 21 may adopt a configuration which it has the accessor 20 in the +Y direction (this can be applied to the following exemplary embodiment, also).

According to the storage library apparatus 1a concerning to this embodiment, the effect that has been described in the first embodiment mentioned above can be received and the position of the first protection lever 4 can be moved more efficiently.

The reason is because the control unit can specify the position of the first protection lever 4 based on the image data of the first protection lever 4 acquired by the camera 21 and the control unit can move the position of the first protection lever 4 when the specified position and the position that has been already held are different.

EXAMPLE

Next, an example based on the storage library apparatus 1a concerning to the second embodiment of the present invention mentioned above will be described. In the following description, it will be described focusing on a characteristic part according to this embodiment. In that case, by attaching the same reference number, the duplicated description will be omitted concerning to the same configuration as each embodiment mentioned above.

A magnetic tape library apparatus 1b in the example according to the second embodiment of the present invention will be described with reference to FIG. 8 and FIG. 9.

FIG. 8 is a perspective view which shows the composition of the magnetic tape library apparatus 1b in the example according to the second embodiment of the present invention.

In FIG. 8, the magnetic tape library apparatus 1b has a control unit 31, a magazine 32, an accessor 33, a magnetic tape drive 34, a guide-rail 35, an operation panel 36 and a power supply 37.

More specifically, for example, the control unit 31 controls the operation of the magnetic tape drive 34 and the accessor 33 according to the operation from an administrator using an unillustrated server (administration terminal) and the operation panel 36. The control unit 31 holds (store) various setting information in the magnetic tape library apparatus 1b and the information which indicates the state of the magazine 32.

The control unit 31 extracts the position information on the first protection lever 4 from the accessor 33 based on acquired the image data. The control unit 31 compares the extracted position information of the first protection lever 4 and the information which indicates the availability state (usable or unusable) of the slot 7 that has been already held.

As a result, according to the comparison, when determining that the position information of the first protection lever 4 is same as the information which indicates the availability state of the slot 7 that has been already held, the control unit 31 finishes the processing.

On the other hand, according to the comparison, the control unit 31 outputs a signal which indicates the direction to move the position of the first protection lever 4 to the accessor 33, when determining that the position information of the first protection lever 4 is different from the information which indicates the availability state of the slot 7 that has already been held.

Figure 9:
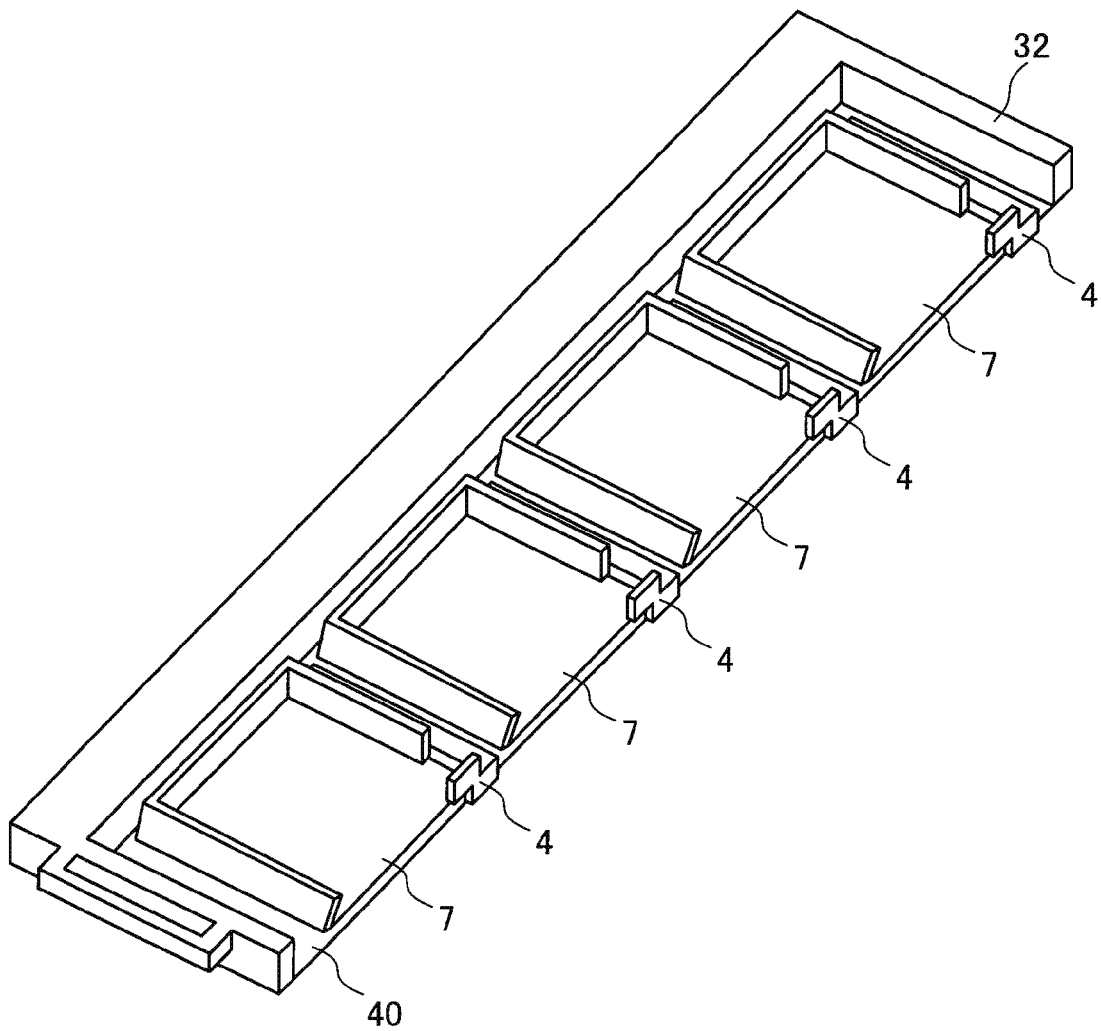
FIG. 9 is a perspective view which shows an internal composition of a magazine in the example according to the second embodiment of the present invention.

FIG. 9 is a perspective view which shows an internal configuration of the magazine 32 in the example according to the second embodiment of the present invention.

The magazine 2 according to the each embodiment of the present invention mentioned above is applied to the magazine 32 shown in FIG. 9. The magazine 32 corresponds to the magazine 2 in the second embodiment. Thus, the magazine 2 according to the each embodiment of the present invention mentioned above is suitable to apply for the case that there are one or more slots.

By sliding to the ±Y direction in FIG. 8, the magazine 32 can be inserted and detached from the magnetic tape library apparatus 1b.

As a result, for example, the administrator can take out the magazine 32 from the magnetic tape library apparatus 1b and perform the changing work of the magnetic tape cartridge in the slot 7 of the magazine 32.

The accessor 33 corresponds to the accessor 20 in the second embodiment. The accessor 33 runs on the guide-rail 35 in the ±Y direction in FIG. 8.

The accessor 33 conveys a desired magnetic tape cartridge from the slot 7 of the magazine 32 to the magnetic tape drive 34.

Further, because the technology itself by which the accessor 33 runs through the guide-rail 35 and conveys to the magnetic tape drive 34 can adopt a general technology at present, the detailed description in this embodiment will be omitted (this can be applied to the following exemplary embodiment, also).

The magnetic tape drive 34 reads and writes the data to a magnetic tape of an unillustrated magnetic tape cartridge.

Further, because the technology itself by which the magnetic tape drive 34 reads and writes data to the magnetic tape can adopt a general technology at present, the detailed description in this embodiment will be omitted (this can be applied to the following exemplary embodiment, also).

For example, the operation panel 36 can carry out the various setting and operation in the magnetic tape library apparatus 1b by operating from the administrator or the like.

The power supply 37 is a unit that supplies the electric power to the magnetic tape library apparatus 1b.

Further, because the technology itself by which the power supply 37 supplies the electric power to the magnetic tape library apparatus 1b can adopt a general technology at present, the detailed description in this embodiment will be omitted (this can be applied to the following exemplary embodiment, also).

Thus, the storage library apparatus 1a described in the second embodiment of the present invention is applied to the magnetic tape library apparatus 1b, and it is suitable.

Further, the operation when acquiring the signal which indicates the direction to move the position of the first protection lever 4 from the control unit 31 is similar to the operation in the magazine 2 and the accessor 20 described in each embodiment. Therefore, the duplicated description will be omitted.

According to the magnetic tape library apparatus 1b concerning to this embodiment, the effect that has been described in each embodiment mentioned above can be received. The magnetic tape library apparatus 1b is suitable to be applied to a generally known magnetic tape library apparatus, for example.

[The Third Exemplary Embodiment]

Next, the third embodiment based on the storage library apparatus 1a according to the second embodiment of the present invention mentioned above will be described. In the following description, it will be described focusing on a characteristic part according to this embodiment. In that case, by attaching the same reference number, the duplicated description will be omitted concerning to the same configuration as each embodiment mentioned above.

The point that the storage library apparatus 1a in the third embodiment is different from the storage library apparatus 1a described in the second embodiment is as stated below.

That is, the accessor 20 in the third embodiment acquires image data of the first protection lever 4 by a camera 21 at timing set in advance. The accessor 20 outputs acquired image data to a control unit (control unit 31 shown in FIG. 8, for example).

The control unit extracts the position information on the first protection lever 4 based on the image data. The control unit compares the extracted position information and the information which indicates the availability state (usable or unusable) of the slot 7 that has been already held.

According to the comparison result of the information which indicates the availability state of the slot 7 that has already been held and the position information extracted on the first protection lever 4, when determining that the position of the first protection lever 4 is different, the control unit rewrites the information which indicates the availability state of the slot 7 that has been held in the control unit into the position information extracted on the first protection lever 4.

More specifically, the control unit outputs the direction to the accessor 20 at the timing set in advance so that the image data of the first protection lever 4 may be outputted to the control unit.

It is noted that, as an example, it is assumed that the timing set in advance means an occasion when the magazine 2 is loaded on the storage library apparatus 1a or the predetermined time. However, the present invention described using this embodiment as an example is not limited to the configuration mentioned above (this can be applied to the following exemplary embodiment, also).

According to the acquired direction, the accessor 20 outputs the image data of the first protection lever 4 acquired by the camera 21 to the control unit.

The control unit extracts the position information on the first protection lever 4 from the accessor 20 based on the acquired image data of the first protection lever 4. The control unit compares the extracted position information and the information which indicates the availability state of the slot 7 that has been already held.

According to the comparison result, when determining that the position of the first protection lever 4 is same as the information which indicates the availability state of the slot 7 that has been already held, the control unit finishes the processing.

On the other hand, according to the comparison result, the control unit rewrites the information which indicates the availability state of the slot 7 that has already been held into the position information on the first protection lever 4 based on the image data when determining that the position of the first protection lever 4 is different from the information which indicates the availability state of the slot 7 that has been already held.

Thus, according to the storage library apparatus 1a concerning to this embodiment, the effect that has been described in the each embodiment mentioned above can be received and the availability state of the slot 7 can be set more efficiently.

The reason is because the magnetic tape cartridge is changed by the administrator and the storage library apparatus 1a can change the availability state stored in the control unit based on the position information on the first protection lever 4 when moving the first protection lever 4 in the magazine 2.

[The Fourth Exemplary Embodiment]

Next, the fourth embodiment based on the storage library apparatus 1a according to the second embodiment of the present invention mentioned above will be described. In the following description, it will be described focusing on a characteristic part according to this embodiment. In that case, the duplicated description will be omitted by attaching the same reference number concerning to the same configuration as each embodiment mentioned above.

A storage library apparatus 1c in the fourth embodiment of the present invention will be described with reference to FIGS. 10 to 12.

Figure 10:
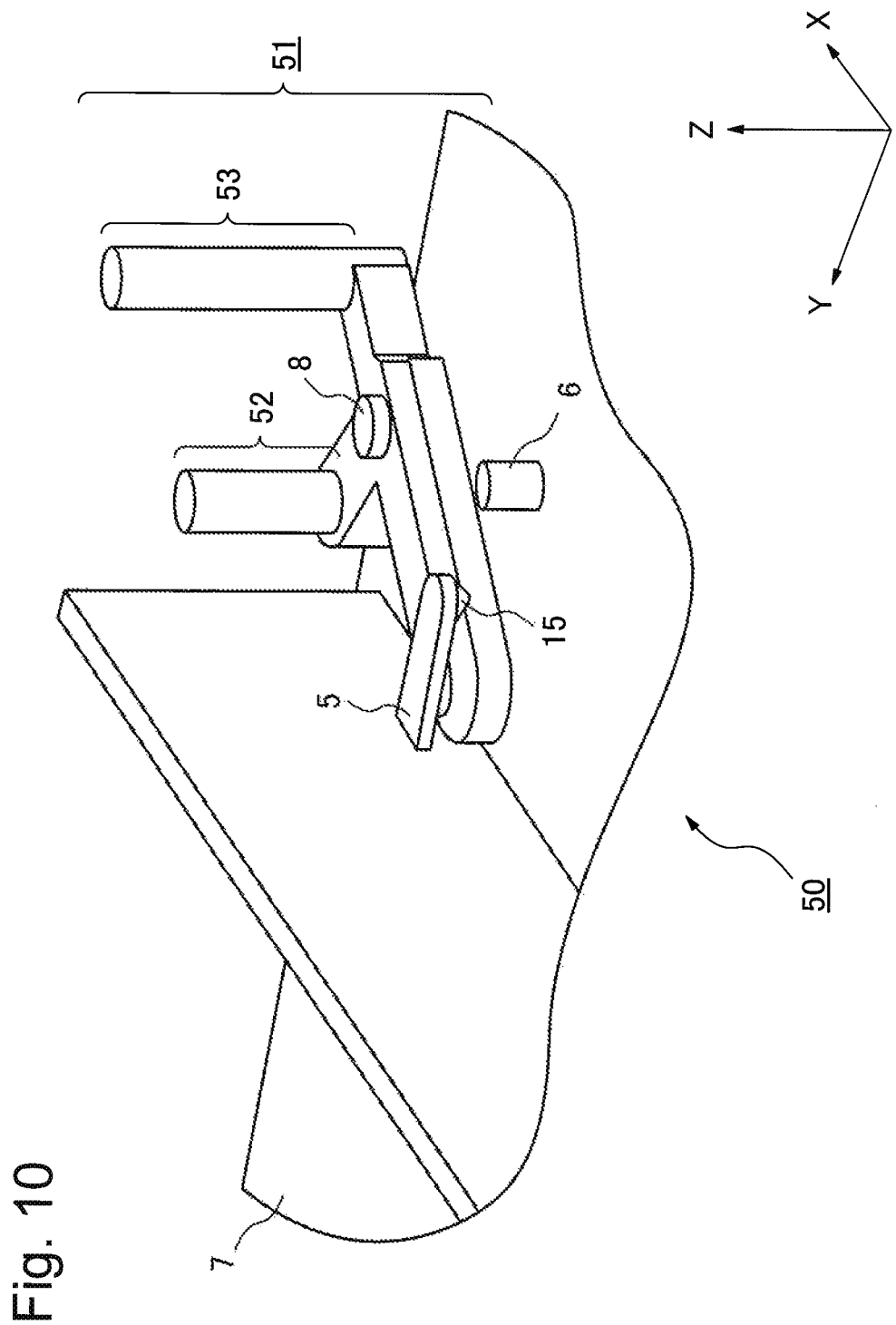
FIG. 10 is a top view which shows a main unit of a storage library apparatus in the fourth embodiment of the present invention.

FIG. 10 is a top view which shows a main unit of the storage library apparatus 1c in the fourth embodiment of the present invention.

Further, in the following description, for convenience of the explanation, a protection lever described in this embodiment is called a second protection lever 51 (this can be applied to the following exemplary embodiment, also).

In FIG. 10, the storage library apparatus 1*c* is different in the point that the first protection lever 4 that has been described in the each embodiment mentioned above has been changed to the second protection lever 51.

More specifically, the storage library apparatus 1*c* has a magazine 50 and the accessor 20 described in the second embodiment.

Figure 11:
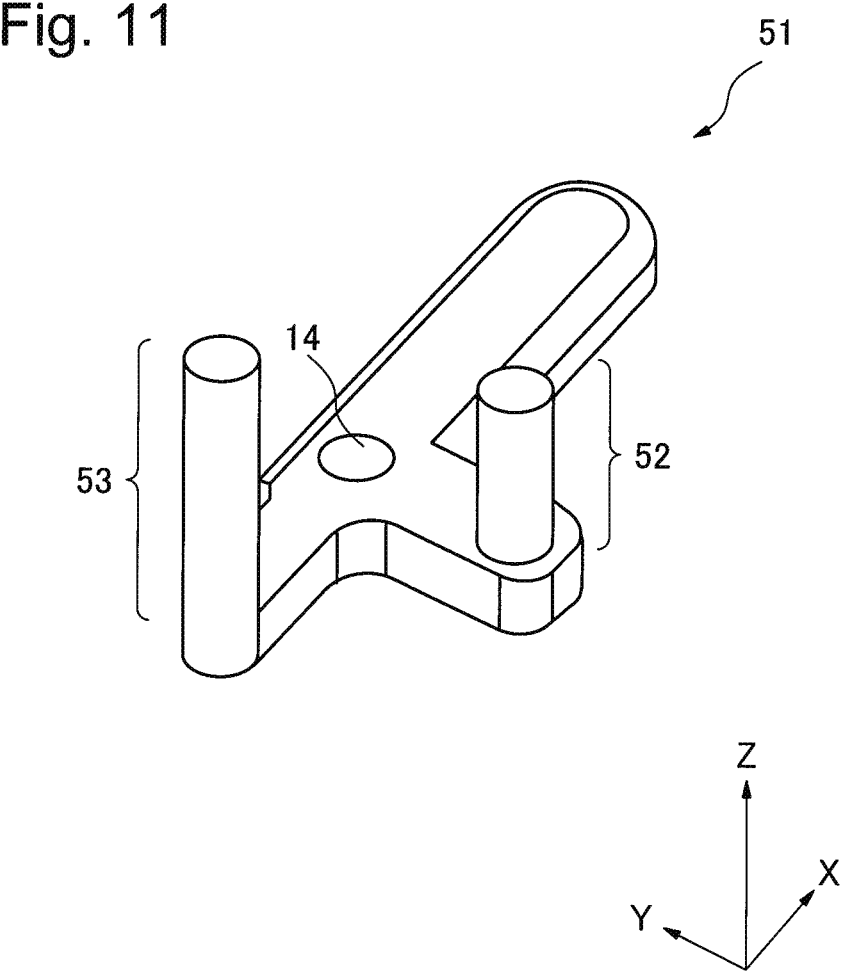
FIG. 11 is a perspective view which shows the composition of the second protection lever in the fourth embodiment of the present invention.
Figure 12:
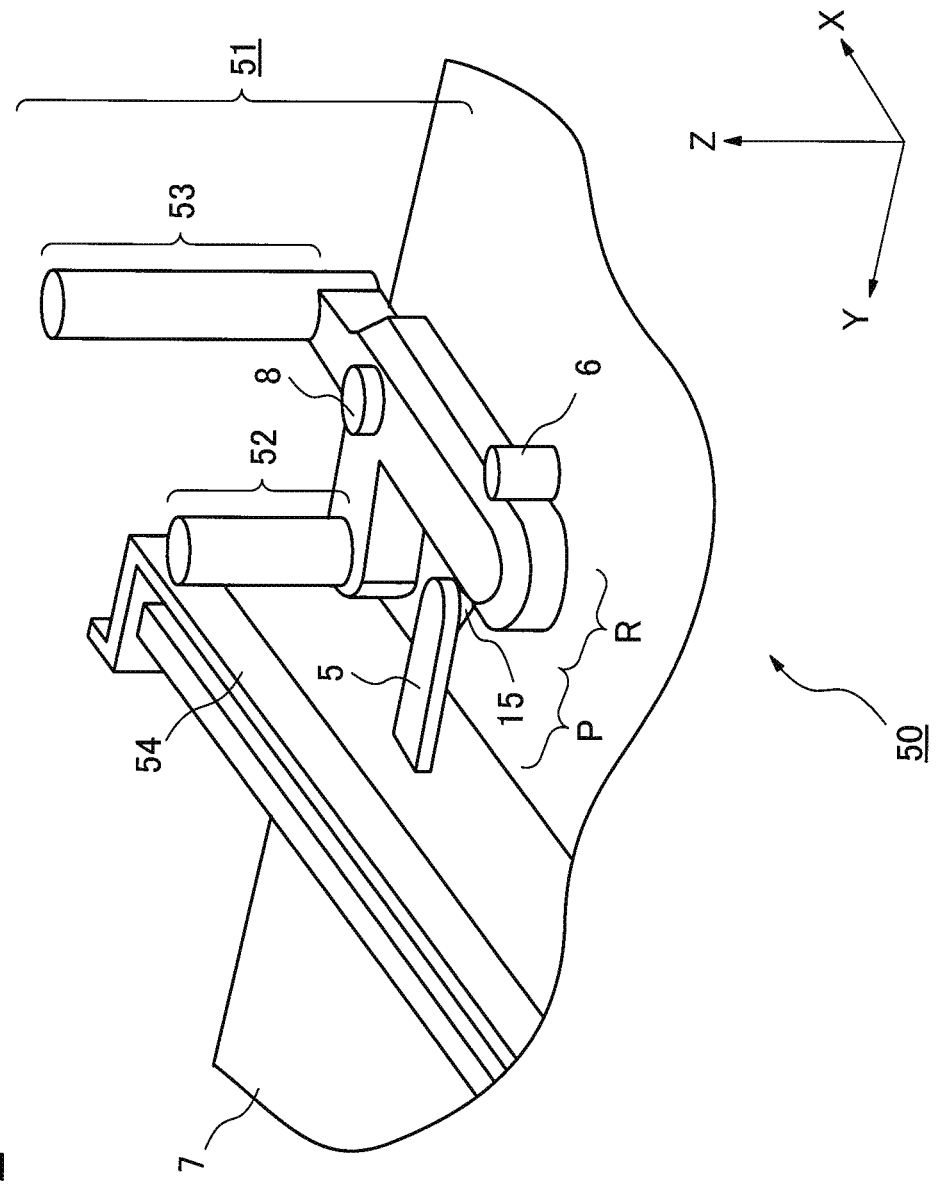
FIG. 12 is a perspective view which exemplifies a main unit of a storage library apparatus in the fourth embodiment of the present invention and the state of a latch.

Further, it is assumed that the storage library apparatus 1*c*, in which an expression has been omitted in FIGS. 10 to 12 for the convenience of the description and the illustration, will have the accessor 20 described in the second embodiment in the +X direction. It is assumed that a magazine 50 has the slot 7 provided by the +Y direction.

The magazine 50 has the second protection lever 51, the lock component 5, the stopper 6, the slot 7 and the rotary shaft 8.

FIG. 11 is a perspective view which shows the composition of the second protection lever 51 in the fourth embodiment of the present invention.

More specifically, the second protection lever 51 has a third contacting surface 53, a second block 52 and the rotating axis hole 14.

The second protection lever 51 is formed in a T shape or a substantially T shape. The second protection lever 51 has the third contacting surface 53 formed in a circle pilaster shape or a substantially circle pilaster shape in one (the −X direction in FIG. 11) of the longitudinal direction.

The third contacting surface 53 contacts against the picker arm 10, and the picker arm 10 may adopt the height (+Z direction in FIG. 11) which enables to push the second protection lever 51.

Further, according to the embodiment mentioned above, for the convenience of the description, as an example, the third contacting surface 53 has been described using the configuration formed in a circle pilaster shape or a substantially circle pilaster shape. However, the embodiment according to the present invention is not limited to the configuration. The third contacting surface 53 contacts against the picker arm 10, and the picker arm 10 may adopt the shape which enables to push the second protection lever 51.

The second protection lever 51 has set on the second block 52 that has been formed in a projecting salient part which is provided in one side (the −Y direction in FIG. 11) of the shorter side direction in a circle pilaster shape or a substantially circle pilaster shape.

The chamfering processing is given to the second protection lever 51 in a ridgeline (+Z direction and both angles in a surface in FIG. 11) in the upper surface in the lengthwise direction.

As a result, the projection 15 can ride on the surface in the second protection lever 51 easily.

A rotating axis hole 14 is formed in a circularity shape or a substantially circularity shape so that the second protection lever 51 can rotate around the rotary shaft 8 as a center axis in one side (the +Y direction or opposite to the second block 52 in FIG. 11) of the shorter side direction. Further, as the center axis, the rotating axis hole 14 may provide the rotary shaft 8 in the size which enables to rotate.

Next, the operation of the storage library apparatus 1*c* according to the fourth embodiment of the present invention will be described in detail more concretely.

FIG. 12 is a perspective view which exemplifies a main unit of the storage library apparatus 1*c* and the state of the latch 54 in the fourth embodiment of the present invention.

It is noted that, as an example, the operation of the storage library apparatus 1*c* will be described in detail, when the second protection lever 51 moving from the position that indicates the usable state to the position (in other words, the second position R shown in FIG. 12) that indicates the unusable state.

Although described using the configuration mentioned before as an example for convenience of the explanation, the present invention is not limited to this exemplary configuration (this can be applied to the following exemplary embodiment, also).

It is noted that, as an example, it is assumed that the slot 7 has the latch 54 which fixes the magnetic tape cartridge on the slot 7.

More specifically, as an example, the latch 54 is provided by a left side face in the slot 7 horizontally. A latch lever is provided so that the latch 54 may project in the position that accommodates the magnetic tape cartridge in one side (the +X direction n FIG. 12) of a longitudinal direction.

Therefore, for example, by releasing (the −Y direction in FIG. 12) the latch lever of the latch 54, the administrator can insert and detach the magnetic tape cartridge.

That is, when the latch lever of the latch 54 is not released, the administrator cannot insert and detach the magnetic tape cartridge.

If the material of the latch 54 has the elastic force which makes the latch lever of the latch 54 return to the original position when the power has been added to the −Y direction in FIG. 12 and the strength that enables to fix the magnetic tape cartridge, the various materials such as the metal and the resin may be adopted.

The accessor 20 moves the position in which the third contacting surface 53 and the picker arm 10 can contact against.

By moving the picker arm 10 to the −X direction shown in FIG. 12, the accessor 20 makes the third contacting surface 53 and the picker arm 10 contact against.

More specifically, when moving the second protection lever 51 from the position that indicates the usable to the position (in other words, the second position R shown in FIG. 12) that indicates the unusable state, the accessor 20 moves to the position where one side (the −Y direction side in FIG. 12) in the third contacting surface 53 and the picker arm 10 are able to contact against. By moving the picker arm 10 to the −X direction in FIG. 12, the accessor 20 makes one side (the −Y side in FIG. 12) in the third contacting surface 53 and the picker arm 10 contact against.

When moving the second protection lever 51 from the unusable state to the position (in other words, the first position P shown in FIG. 12) that indicates the usable state on the one hand, the accessor 20 moves to the position where the other side (the +Y direction side in FIG. 12) and the picker arm 10 in the third contacting surface 53 can contact against. By moving the picker arm 10 to the −X direction in FIG. 12, the accessor 20 makes other side (the +Y direction side in FIG. 12) and the picker arm 10 in the third contacting surface 53 contact against.

It is noted that, the accessor 20 moves to the position where one side (the −Y direction side in FIG. 12) in the third contact surface 53 and the picker arm 10 contact against.

By moving the own apparatus (accessor 20 itself) to the ±Y direction (the paper horizontal direction in FIG. 12) in FIG. 12, the accessor 20 pushes the second protection lever 51 in the position (in other words, any one of the positions of the first position P shown in FIG. 12 and the second position R) that indicates the availability state of the slot 7 which is held by the control unit.

More specifically, when moving the second protection lever 51 from the position that indicates the usable state to the position (in other words, the second position R shown in FIG. 12) that indicates the unusable state, by moving the own apparatus (accessor 20 itself) to the +Y direction in FIG. 12, the accessor 20 pushes the second protection lever 51 to the position that indicates the unusable state.

When moving the second protection lever 51 from the unusable state to the position (in other words, the first position P shown in FIG. 12) that indicates the usable state on the one hand, by moving the own apparatus (accessor 20 itself) to the −Y direction in FIG. 12, the accessor 20 pushes the second protection lever 51 to the position that indicates the usable state.

It is noted that, by moving the own apparatus (accessor 20 itself) to the +Y direction in FIG. 12, the accessor 20 pushes the second protection lever 51 from the position that indicates the usable state to the position that indicates the unusable state.

As a result, the second protection lever 51 rotates around the rotary shaft 8 as a center to the +Y direction in FIG. 12.

More specifically, in the second protection lever 51, one side (the −Y direction side in FIG. 12) in the third contact surface 53 and the picker arm 10 contact against. The second protection lever 51 rotates around the rotary shaft 8 as a center to the +Y direction in FIG. 12 by pushing the third contacting surface 53 to the +Y direction in FIG. 12.

As a result, the projection 15 provided in an edge of the lock component 5 in the state of crossing with the second protection lever 51 rides on the upper surface of the second protection lever 51.

When passing the edge of the shorter side direction of the second protection lever 51 in the state that the projection 15 has crossed as mentioned above, the second protection lever 51 contacts against the stopper 6. The lock component 5 returns to the original shape. Therefore, the lock component 5 can fix the second protection lever 51 by the projection 15. The second block 52 contacts against the latch 54.

As a result, for example, because the second block 52 and the latch 54 are in contact, the administrator cannot release the latch lever of the latch 54.

That is, when the slot 7 cannot be used, by the second block 52 being in contact with the latch 54, the administrator cannot release the latch lever of the latch 54. In other words, the storage library apparatus 1c can prevent insertion and detachment of the magnetic tape cartridge.

Further, the second block 52 may adopt the height capable of contacting against the latch 54 (in FIG. 12, +Z direction).

According to the embodiment mentioned above, for the convenience of the description, as an example, the second block 52 has been described taking the configuration formed like the column shape or the substantially column shape for instance. However, the embodiment according to the present invention is not limited to the configuration. The second block 52 may adopt the shape capable of contacting against the latch 54.

When moving the second protection lever 51 from the unusable state to the position (in other words, the first position P shown in FIG. 12) that indicates the usable state on the one hand, other side of the third contacting surface 53 (in FIG. 12, the +Y direction side) contact against the picker arm 10. By pushed the third contacting surface 53 (in FIG. 12, the +Y direction side) the second protection lever 51 rotate around the rotary shaft 8 as a center to the −Y direction shown in FIG. 12.

As a result, the projection 15 provided in an edge of the lock component 5 rides on the upper surface of the second protection lever 51 in the state of crossing the second protection lever 51.

When passing the edge of the longitudinal side direction of the second protection lever 51 in the state that the projection 15 has been crossing as mentioned above, one end of the shorter side direction of the second protection lever 51 is contacted against the side in the slot 7. The lock component 5 returns to the original shape. Therefore, the lock component 5 can fix the second protection lever 51 by the projection 15.

Further, for the convenience of the description, as an example, the fourth embodiment based on the storage library apparatus 1a according to the second embodiment of the present invention has been described. However, the embodiment according to the present invention is not limited to the configuration.

The configurations based on the first embodiment and the third embodiment of the present invention may be adopted.

According to the storage library apparatus 1c concerning to this embodiment, the effect that has been described in each embodiment mentioned above can be received.

It is the reason that the storage library apparatus 1c cannot release the latch lever of the latch 54 due to that the second block 52 contacts against the latch 54 when the slot 7 is not usable. Therefore, the storage library apparatus 1c can prevent the insertion and detachment of the magnetic tape cartridge.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty.

Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

Industrial Applicability

The present invention is not limited to each embodiment mentioned above. The present invention can be applied to not only a stored cartridge in which the computer readable storage medium such as a magnetic tape or an optical disc is stored but also a copy machine, a compound machine and a library apparatus which handle the various cartridges.

DESCRIPTION OF REFERENCE NUMERALS

1 Storage library apparatus.
1a Storage library apparatus.
1b Magnetic tape library apparatus.
1c Storage library apparatus.
2 Magazine.
3 Accessor.
4 First protection lever.
5 Lock component.
6 Stopper.
7 Slot.
8 Rotary shaft.
9 Picker.

10 Picker arm.
11 First block.
12 First contacting surface.
13 Second contacting surface.
14 Rotating axis hole
15 Projection.
20 Accessor.
21 Camera.
31 Control unit.
32 Magazine.
33 Accessor.
34 Magnetic tape drive.
35 Guide-rail.
36 Operation panel.
37 Power supply.
40 Magazine base.
50 Magazine.
51 Second protection lever.
52 Second block.
53 Third contacting surface.
54 Latch

The invention claimed is:

1. A library apparatus comprising:
a lock component protruded to one or more slot sides which can insert and detach a cartridge;
a rotary shaft provided near the slot;
a protection lever which can rotate around the rotary shaft as a center axis; and
a stopper provided in a position preventing a rotating when contacting against one end of the shorter side direction of the protection lever;
wherein the protection lever, by being pushed an accessor capable of convey the cartridge, rotates to a first position indicating a usable state of the slot, thereby contacts against the stopper and is fixed by the lock component,
the protection lever is, by rotating to the second position that indicates the unusable state, fixed by the lock component,
the library apparatus further includes a camera which can acquire image data of the protection lever in the accessor,
the accessor with the camera pushes the protection lever to any one position of the first position and the second position in accordance with a result of processing which determines a position of the protection lever based on the image data acquired from an external apparatus, and
the processing is a processing to the extract position information of the protection lever based on the image data acquired by the camera, compare the extracted position information and the held information indicating the position of the protection lever, and give the accessor an instruction to move the position of the protection lever based on the held information indicating position of the protection lever when the extracted position information is different from the held information indicating position of the protection lever according to the comparison result.

2. A library apparatus according to claim 1, wherein:
the protection lever includes
a first contacting surface which contacts against a picker arm of the accessor when rotating to the first position,
a second contacting surface which contacts against the picker arm when rotating to the second position, and
a first block which prevents the insertion and detachment of the cartridge when rotating to the second position.

3. A library apparatus according to claim 1, wherein:
the protection lever includes
a third contacting surface which contacts against the picker arm of the accessor when rotating to any one position of the first position and the second position, and
a second block which prevents the insertion and detachment of the cartridge when rotating to the second position, and
wherein the third contacting surface contacts against one side of the picker arm and the third contacting surface when rotating to the first position and contacts against the other side of the picker arm and the third contacting surface when rotating to the second position.

4. A library apparatus according to claim 3, wherein:
the protection lever prevents the insertion and detachment of the cartridge by contacting to the second block and a latch provided in the slot fixing the cartridge.

5. A library apparatus according to claim 1, wherein:
the library apparatus carries out the processing to judge the position based on the image data, and rewrites the information indicating the position of the protection lever held in the external apparatus into the extracted position information in accordance with the judgment result.

6. A library apparatus according to claim 1, wherein:
the external apparatus is a control unit that controls the operation of an own-apparatus.

7. A library apparatus according to claims 1, wherein:
a projection provided in an edge of the lock component rides on an upper surface of the protection lever in a state crossing the protection lever, and fixes the protection lever when passing an edge of a shorter side direction of the protection lever in a case of rotating any one position of the first position and the second position by being pushed with the accessor.

8. A library apparatus according to claims 1, wherein:
a storage is stored in the cartridge, and
the library apparatus handling the cartridge is a storage library apparatus.

* * * * *